United States Patent
Zhong et al.

(10) Patent No.: US 8,866,981 B2
(45) Date of Patent: Oct. 21, 2014

(54) VERTICAL ALIGNMENT LIQUID CRYSTAL PANEL

(71) Applicant: Shenzhen China Star Optoelectronics Technology Co., Ltd., Guangdong (CN)

(72) Inventors: Xinhui Zhong, Shenzhen (CN); Xing Feng, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 195 days.

(21) Appl. No.: 13/807,064

(22) PCT Filed: Nov. 30, 2012

(86) PCT No.: PCT/CN2012/085588
§ 371 (c)(1),
(2), (4) Date: Dec. 27, 2012

(87) PCT Pub. No.: WO2014/079089
PCT Pub. Date: May 30, 2014

(65) Prior Publication Data
US 2014/0146256 A1  May 29, 2014

(30) Foreign Application Priority Data
Nov. 23, 2012 (CN) .......................... 2012 1 0483123

(51) Int. Cl.
| | | |
|---|---|---|
| *G02F 1/1337* | (2006.01) | |
| *G02F 1/1334* | (2006.01) | |
| *G02F 1/1343* | (2006.01) | |
| *G02F 1/1362* | (2006.01) | |
| *C09K 19/54* | (2006.01) | |
| *C09K 19/58* | (2006.01) | |
| *G02F 1/137* | (2006.01) | |

(52) U.S. Cl.
CPC *G02F 1/133788* (2013.01); *G02F 2001/13775* (2013.01)

USPC .............. 349/38; 349/42; 349/130; 349/191; 428/1.3; 252/299.5

(58) Field of Classification Search
USPC ............. 252/299.01, 299.61, 299.63, 299.66; 349/38, 42, 130, 191; 428/1.3
See application file for complete search history.

(56) References Cited

U.S. PATENT DOCUMENTS

| | | | |
|---|---|---|---|
| 8,405,799 B2 * | 3/2013 | Fujisawa et al. ................ 349/88 |
| 2006/0119782 A1 | 6/2006 | Sha et al. |
| 2007/0195034 A1 | 8/2007 | Hayashi et al. |

FOREIGN PATENT DOCUMENTS

| | | |
|---|---|---|
| CN | 101646695 A | 2/2010 |
| CN | 103160287 A | 6/2013 |
| JP | 2010090277 A | 4/2010 |
| JP | 2010195921 A | 9/2010 |

* cited by examiner

Primary Examiner — Shean C Wu
(74) Attorney, Agent, or Firm — Andrew C. Cheng

(57) ABSTRACT

The invention provides a vertical alignment liquid crystal panel, which includes a first glass substrate, a second glass substrate, and a liquid crystal layer that includes negative liquid crystal containing liquid crystal molecules having a pre-tilt angle of 0°-7°, chiral agent, and a photo- or heat-polymerizable polymer. The first glass substrate includes a liquid crystal panel driving circuit, which includes a gate driver, a source driver, a plurality of gate lines, and a plurality of data lines. The gate lines and the data lines define a plurality of pixel units, each of which includes a thin-film transistor, a common electrode, and a pixel electrode. The source driver applies a driving voltage of 0-6V via the thin-film transistor to the pixel electrode. The present invention improves elastic energy between the liquid crystal molecules and thus avoids image sticking caused by long term displaying of the same image at the same location.

10 Claims, 1 Drawing Sheet

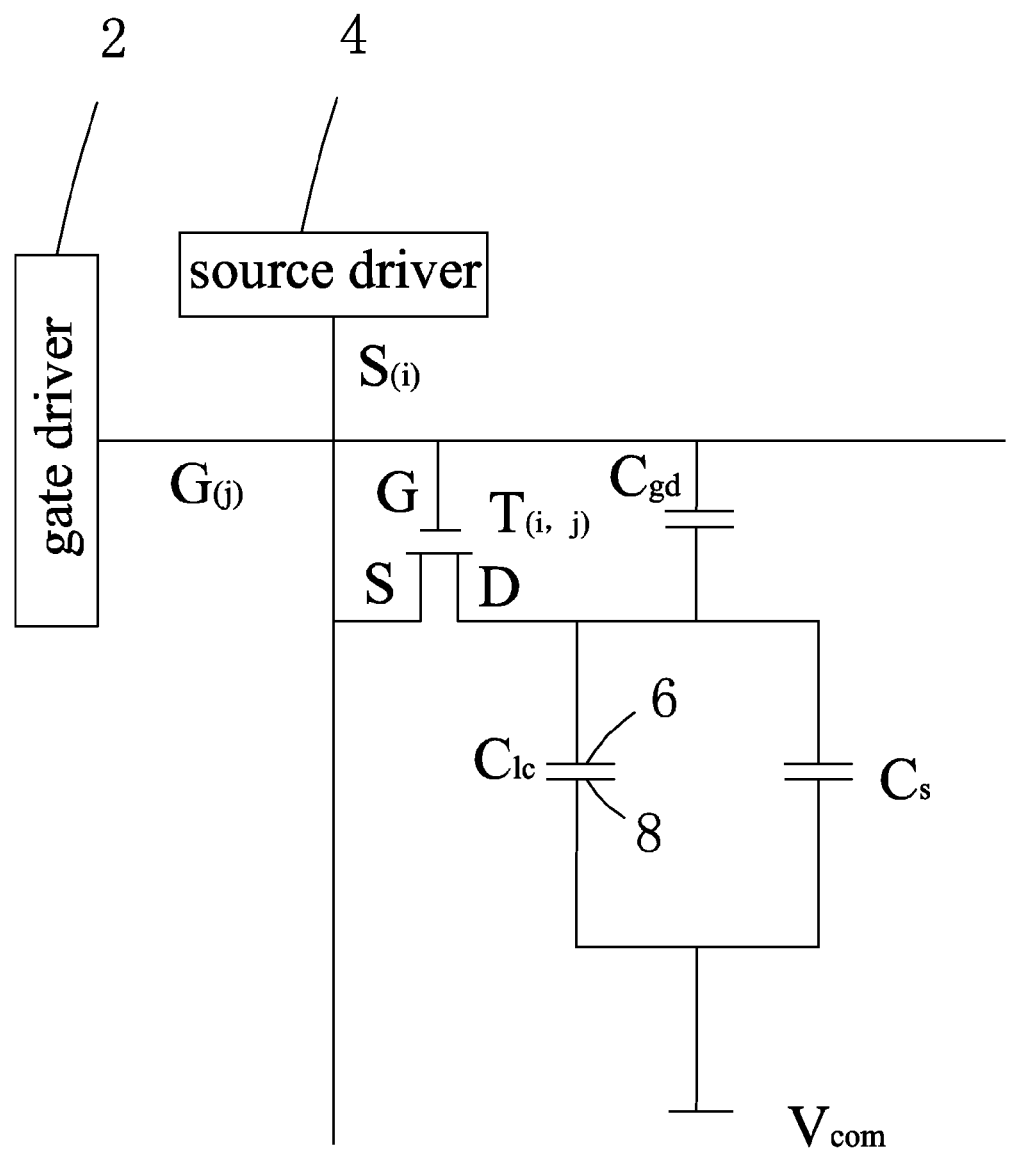

VERTICAL ALIGNMENT LIQUID CRYSTAL PANEL

BACKGROUND OF THE INVENTION

1. Field of the Invention

The present invention relates to the field of liquid crystal display, and in particular to a vertical alignment liquid crystal panel.

2. The Related Arts

A liquid crystal display is a displaying device, which comprises a layer of liquid crystal interposed between two opposite substrates. The displaying device effects light switching by applying electrical excitation and optical anisotropy of the liquid crystal. With the anisotropy of refractivity of liquid crystal molecule, the liquid crystal display applies electrical voltage to the liquid crystal molecule to reorienting the axis of anisotropy of refractivity to control the luminance of light transmitting through the liquid crystal molecule.

Whether a liquid crystal display is good or poor is primarily determined by the panel used, because the quality of the panel directly affects the impression of viewing the screen. In addition, a liquid crystal television panel takes more than one half of the cost of the whole device and is the primary factor that affects the cost of manufacturing a liquid crystal television. Thus, a good liquid crystal television is primarily dependent on the panel thereof.

The liquid crystal layer is the main body of a liquid crystal display and the liquid crystal layers used in various devices are generally formed by mixing several or tens of monomer liquid crystal layers. A liquid crystal layer generally comprises liquid crystal molecules and photo- or heat-polymerizable monomers.

In a MVA (Multidomain Vertical Alignment) liquid crystal display, without application of electrical voltage, the liquid crystal molecules are almost in the vertical orientation. However, applying an electrical voltage will cause the liquid crystal molecules to tilt in a predetermined direction set by multiple bumps and slits formed a vertical alignment film. In a liquid crystal display that incorporates a polarizer, the tilt direction of the liquid crystal molecules must also be controlled to be at an angle of 45° with respect to an absorption axis of the polarizer. However, the liquid crystal molecules, as a continuous medium, may tilt in an intermediate direction thereof and it is inevitable that liquid crystal zones that tilt at an angle different from the preset tilt angle exist. The existence of such zones causes inconsistency of luminance around those zones. To cope with such a situation of inconsistent alignment of liquid crystal, a photo- or heat-polymerizable component is added in the liquid crystal layer, whereby electrical voltage or light irradiation may be applied to cause polymerization of the polymerizable component in order to constrain the tilt direction of the liquid crystal molecule under the application of electrical voltage.

However, adopting such a technique that uses a material having a heat- or photo-polymerizable component may lead to image sticking phenomenon if the polymerization is incomplete. This is because of the polymer so polymerized having insufficient hardness and undergoing deformation caused by re-orientation of liquid crystal molecules when electrical voltage is applied.

On the other hand, if the polymerizable monomers for constraining alignment do not form sufficient cross-linked structure after polymerization, then the polymer so formed gets soft with reduced restoration power. Under this condition, when liquid crystal molecules are caused to tilt with the application of electrical voltage and sustain such a condition, even thought the applied electrical voltage is gone, the tilt angle of the liquid crystal does not return to the original condition. Such a defect also causes image sticking.

Further, when a liquid crystal display displays the same image for a predetermined period of time, image sticking also occurs in the portion that displays the image. This is deemed caused by weakened restoration power of liquid crystal molecules due to incomplete polymerization and deformation of polymer. To have the monomers sufficiently polymerized, light irradiation must be intensified or the heating time extended. This affects the manufacture cycle of product.

Several primary solutions that are proposed to cope with those image sticking phenomena occurring in liquid crystal display that contains photo- or heat-polymerizable component of monomer are discussed as follows and they also show shortcomings:

(1) For image sticking caused by insufficient cross-linked structure formed after the polymerization of the photo- or heat-polymerizable material, the solution is that a plurality of steps are carried out to irradiate the liquid crystal layer with light that has different light intensity or different ultraviolet intensity or both different light intensity and different ultraviolet intensity before or after or both before and after application of rotating voltage or under a condition of applying no rotating voltage, wherein the liquid crystal layer is a liquid crystal layer containing a photo- or heat-polymerizable material.

The shortcoming of this solution is that the number of steps that make the photo- or heat-polymerizable material contained in the liquid crystal layer polymerized to form strong cross-linked structure is large and the component and intensity of irradiation light used in each step are different. Further, a sharp border is present between the steps and parameters are set differently between these steps, such as timing for applying electrical voltage in each step, variation of light intensity between steps, or variation of ultraviolet intensity between steps.

(2) For image sticking caused by weakening of restoration power of liquid crystal molecules caused by insufficient polymerization of the photo- or heat-polymerizable material, the solution is that after the execution of the polymerization step for alignment control, additional irradiation of ultraviolet light is applied to the liquid crystal layer containing the photo- or heat-polymerizable material. The additional ultraviolet light has a wavelength that is different from that of the ultraviolet light that was previously used, before the application of the additional ultraviolet light, to polymerize the polymerizable material contained in the liquid crystal. During the irradiation of the additional ultraviolet light, no driving voltage is applied. Also, the irradiation time is 10 minutes or longer for the purposes of making the residue polymerizable material that is not completely polymerized more sufficiently polymerized.

The shortcoming of this solution is that after the step of executing light irradiation for polymerizing the photo- or heat-polymerizable material contained in the mixed liquid crystal layer, it is still necessary to apply the additional irradiation of ultraviolet light to have the polymerizable material completely polymerized and the time of the additional irradiation of ultraviolet light is extended, thereby increasing the manufacture cycle of product.

SUMMARY OF THE INVENTION

An object of the present invention is to provide a vertical alignment liquid crystal panel, which increases the elastic energy between liquid crystal molecules so as to eliminate the image sticking caused by the same portion of a liquid crystal display that uses the liquid crystal module displaying the same image for an extended period of time and also ensure the displaying performance of using the liquid crystal panel.

To achieve the objects, the present invention provides a vertical alignment liquid crystal panel, which comprises a first glass substrate, a second glass substrate that is arranged opposite to and parallel with the first glass substrate, and a liquid crystal layer. The first glass substrate comprises a first base and a first vertical alignment film. The second glass substrate comprises a second base and a second vertical alignment film. The first and second vertical alignment films are arranged between the first and second bases. The liquid crystal layer is arranged the first and second vertical alignment films. The liquid crystal layer comprises negative liquid crystal, a chiral agent, and a photo- or heat-polymerizable polymer. The negative liquid crystal comprises a plurality of liquid crystal molecules. The liquid crystal molecules have a pre-tilt angle of 0°-7°. The first glass substrate comprises a liquid crystal panel driving circuit formed thereon. The liquid crystal panel driving circuit comprises a gate driver, a source driver, a plurality of gate lines, and a plurality of data lines. The plurality of gate lines and data lines define a plurality of pixel units. Each of the pixel units comprises a thin-film transistor, a common electrode, and a pixel electrode electrically connected to the thin-film transistor. The thin-film transistor is electrically connected via the respective gate line and the respective data line to the gate driver and the source driver respectively. The common electrode and the pixel electrode collectively form a liquid crystal capacitor. The source driver applies a driving voltage of 0-6V via the thin-film transistor to the pixel electrode.

The ratio of the chiral agent added to the liquid crystal layer is determined by C=1/(HTP*P), where C indicates mass percentage concentration of the chiral agent, P is pitch of the liquid crystal molecules, and HTP is the power of the chiral agent to cause the liquid crystal molecules to rotate, namely twisting force.

Mass percentage concentration of the chiral agent added in the liquid crystal layer is 0.5%-5%.

Mass percentage concentration of the photo- or heat-polymerizable polymer added in the liquid crystal layer is 0.1%-5%.

The photo- or heat-polymerizable polymer is formed of photo- or heat-polymerizable monomers irradiated by ultraviolet light or light comprising ultraviolet component.

The thin-film transistor comprises a source terminal, a gate terminal, and a drain terminal. The source terminal is electrically connected via the respective data line to the source driver. The gate terminal is electrically connected via the respective gate line to the gate driver. The drain terminal is electrically connected to the pixel electrode.

The liquid crystal molecules have a structural formula as follows:

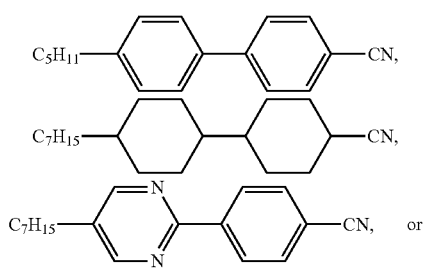

-continued

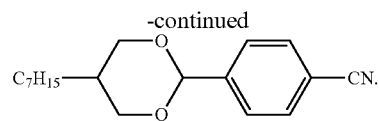

The chiral agent selectively comprises chiral agent S811, chiral agent R811, chiral agent S1011, chiral agent R1011, fluorine-contained chiral agent.

The vertical alignment liquid crystal panel according to the present invention further comprises a storage capacitor. The storage capacitor is connected in parallel with the liquid crystal capacitor.

The present invention also provides a vertical alignment liquid crystal panel, which comprise a first glass substrate, a second glass substrate that is arranged opposite to and parallel with the first glass substrate, and a liquid crystal layer, the first glass substrate comprising a first base and a first vertical alignment film, the second glass substrate comprising a second base and a second vertical alignment film, the first and second vertical alignment films being arranged between the first and second bases, the liquid crystal layer being arranged the first and second vertical alignment films, the liquid crystal layer comprising negative liquid crystal, a chiral agent, and a photo- or heat-polymerizable polymer, the negative liquid crystal comprising a plurality of liquid crystal molecules, the liquid crystal molecules having a pre-tilt angle of 0°-7°, the first glass substrate comprising a liquid crystal panel driving circuit formed thereon, the liquid crystal panel driving circuit comprising a gate driver, a source driver, a plurality of gate lines, and a plurality of data lines, the plurality of gate lines and data lines defining a plurality of pixel units, each of the pixel units comprising a thin-film transistor, a common electrode, and a pixel electrode electrically connected to the thin-film transistor, the thin-film transistor being electrically connected via the respective gate line and the respective data line to the gate driver and the source driver respectively, the common electrode and the pixel electrode collectively forming a liquid crystal capacitor, the source driver applying a driving voltage of 0-6V via the thin-film transistor to the pixel electrode;

wherein the ratio of the chiral agent added to the liquid crystal layer is determined by C=1/(HTP*P), where C indicates mass percentage concentration of the chiral agent, P is pitch of the liquid crystal molecules, and HTP is the power of the chiral agent to cause the liquid crystal molecules to rotate, namely twisting force;

wherein mass percentage concentration of the chiral agent added in the liquid crystal layer is 0.5%-5%;

wherein mass percentage concentration of the photo- or heat-polymerizable polymer added in the liquid crystal layer is 0.1%-5%;

wherein the photo- or heat-polymerizable polymer is formed of photo- or heat-polymerizable monomers irradiated by ultraviolet light or light comprising ultraviolet component;

wherein the thin-film transistor comprises a source terminal, a gate terminal, and a drain terminal, the source terminal being electrically connected via the respectively data line to the source driver, the gate terminal being electrically connected via the respective gate line to the gate driver, the drain terminal being electrically connected to the pixel electrode;

wherein the liquid crystal molecules have a structural formula as follows:

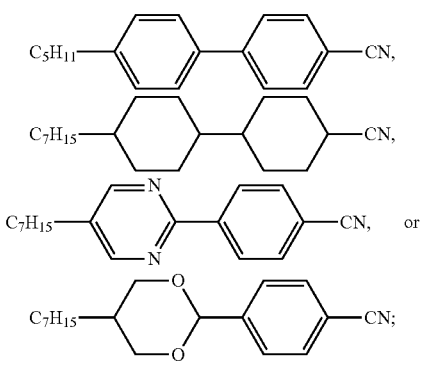

wherein the chiral agent selectively comprises chiral agent S811, chiral agent R811, chiral agent S1011, chiral agent R1011, fluorine-contained chiral agent; and further comprising a storage capacitor, the storage capacitor being connected in parallel with the liquid crystal capacitor.

The efficacy of the present invention is that the present invention provides a vertical alignment liquid crystal panel, which, through addition of chiral agent in a liquid crystal layer, increases elastic energy between the liquid crystal molecules so as to avoid the issue of image sticking caused by long term displaying the same image in the same area of a liquid crystal display incorporating the liquid crystal panel and also properly increase the driving voltage applied to the pixel electrode to ensure the response speed of the liquid crystal molecules.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawing. In the drawing:

FIG. 1 is a schematic view showing the structure of a driving circuit of a vertical alignment liquid crystal panel according to the present invention.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Referring to FIG. 1, the present invention provides a vertical alignment liquid crystal panel, which comprises a first glass substrate, a second glass substrate that is arranged opposite to and parallel with the first glass substrate, and a liquid crystal layer arranged between the first glass substrate and the second glass substrate (all not shown). The first glass substrate comprises a first base and a first vertical alignment film. The second glass substrate comprises a second base and a second vertical alignment film. The first and second vertical alignment films are arranged between the first and second bases. The liquid crystal layer is arranged between the first and second vertical alignment films. The liquid crystal layer comprises negative liquid crystal. The negative liquid crystal comprises a plurality of liquid crystal molecules. Due to the effect of the first and second vertical alignment films, the liquid crystal molecules, when not subjected to any application of electrical voltage, are all perpendicular to the first and second glass substrates.

The first glass substrate comprises a liquid crystal panel driving circuit formed thereon. The liquid crystal panel driving circuit comprises agate driver 2, a source driver 4, a plurality of gate lines S(i), and a plurality of data lines G(j). The plurality of gate lines S(i) and data lines G(j) define a plurality of pixel units. Each pixel unit comprises a thin-film transistor T(i, j), a common electrode 8, a pixel electrode 6 electrically connected to the thin-film transistor T(i, j), and a storage capacitor Cs. The thin-film transistor T(i, j) is electrically connected via the gate line S(i) and the data line G(j) to the gate driver 2 and the source driver 4 respectively. The common electrode 8 and the pixel electrode 6 collectively constitute a liquid crystal capacitor C1c. The storage capacitor Cs and the liquid crystal capacitor C1c are connected in parallel to each other. Charging and discharging of the storage capacitor Cs effect voltage compensation on the pixel electrode 6 so as to improve the accuracy of driving the pixel electrode 6.

The thin-film transistor T(i, j) comprises a source terminal S, a gate terminal G, and a drain terminal D. The source terminal S is electrically connected by the data line S(i) to the source driver 4. The gate terminal G is electrically connected by the gate lines G(j) to the gate driver 2. The drain terminal D is electrically connected to the pixel electrode 6. The electrical voltage applied to the gate terminal G controls the writing operation of the pixel unit containing the thin-film transistor T(i, j) so as to drive the liquid crystal molecules to rotate and thus effecting displaying of image. FIG. 1 shows a capacitor Cgd, which is a parasitic capacitor generated between the drain terminal D and the gate terminal G of the thin-film transistor T(i, j) due to structural characteristics.

The liquid crystal layer also comprises a chiral agent and a photo- or heat-polymerizable polymer. The photo- or heat-polymerizable polymer is formed of photo- or heat-polymerizable monomers irradiated by ultraviolet light or a light containing ultraviolet component. The photo- or heat-polymerizable polymer is added in the liquid crystal layer by a mass percentage concentration of 0.1%-5%. The ratio of the chiral agent added in the liquid crystal layer is determined by the reference equation $C=1/(HTP*P)$, wherein C indicates mass percentage concentration of the chiral agent, P is pitch of the liquid crystal molecules, and HTP is the power of the chiral agent to cause the liquid crystal molecules to rotate, namely twisting force. In the instant preferred embodiment, the chiral agent is added in the liquid crystal layer by a mass percentage concentration of 0.5%-5%. Further, the chiral agent can be chiral agent S811, chiral agent R811, chiral agent S1011, chiral agent R1011, or fluorine-contained chiral agent.

The liquid crystal molecules have a pre-tilt angle of 0°-7° to ensure all the liquid crystal molecules will rotate in the same direction when subjected to an application of electrical voltage and to improve displaying quality and shorten the response time of the liquid crystal molecules. The size f the pre-tilt angle is determined by the liquid crystal material used and alignment agent. The liquid crystal molecules have a structural formula having a specific structure as shown below:

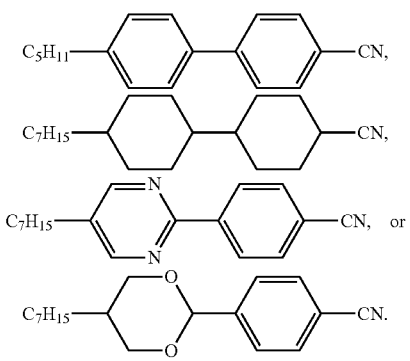

Adding the chiral agent to the liquid crystal layer causes a change of the primary helical pitch of the liquid crystal molecules and thus increases the elastic energy of the liquid crystal molecules, meaning that adding the chiral agent to the liquid crystal layer will increase the viscosity of the liquid crystal layer. The viscosity formula of the liquid crystal layer is $n=Td/(k*d^2)$, where Td indicates response time of liquid crystal display, k is related to elastic coefficient, and d is the thickness of the liquid crystal layer between two substrates. It can be found from the formula that the change of viscosity caused by the chiral agent is accompanied with change of the elastic coefficient of the liquid crystal molecules, leading to entirely changing the elastic energy between the liquid crystal molecules so as to help preventing image sticking caused by long term displaying the same image at the same area and also to properly increase the driving voltage applied to the pixel electrode 6 to satisfy the need of electric field energy for rotation of the liquid crystal molecules so as to improve the capability of rotation of the liquid crystal molecules to ensure response time. In the instant preferred embodiment, the driving voltage that the source driver 4 applies via the thin-film transistor T(I, j) to the pixel electrode 6 is preferably 0-6V. The driving voltage is adjustable according to the amount of the chiral agent added.

Adding chiral agent to the liquid crystal layer will increase the elastic energy between the liquid crystal molecules and thus even though the photo- or heat-polymerizable monomers are not fully polymerized and provide no strong cross-linked structure, for such a situation of displaying the same image for a long time, which makes the liquid crystal molecules rotated at the same rotation angle for a long time, the liquid crystal molecules are still capable of resuming the original condition with the assistance of their stronger elastic energy so as to avoid image sticking phenomenon.

In summary, the present invention provides a vertical alignment liquid crystal panel, which, through addition of chiral agent in a liquid crystal layer, increases elastic energy between the liquid crystal molecules so as to avoid the issue of image sticking caused by long term displaying the same image in the same area of a liquid crystal display incorporating the liquid crystal panel and also properly increase the driving voltage applied to the pixel electrode to ensure the response speed of the liquid crystal molecules.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A vertical alignment liquid crystal panel, comprising a first glass substrate, a second glass substrate that is arranged opposite to and parallel with the first glass substrate, and a liquid crystal layer, the first glass substrate comprising a first base and a first vertical alignment film, the second glass substrate comprising a second base and a second vertical alignment film, the first and second vertical alignment films being arranged between the first and second bases, the liquid crystal layer being arranged the first and second vertical alignment films, the liquid crystal layer comprising negative liquid crystal, a chiral agent, and a photo- or heat-polymerizable polymer, the negative liquid crystal comprising a plurality of liquid crystal molecules, the liquid crystal molecules having a pre-tilt angle of 0°-7°, the first glass substrate comprising a liquid crystal panel driving circuit formed thereon, the liquid crystal panel driving circuit comprising a gate driver, a source driver, a plurality of gate lines, and a plurality of data lines, the plurality of gate lines and data lines defining a plurality of pixel units, each of the pixel units comprising a thin-film transistor, a common electrode, and a pixel electrode electrically connected to the thin-film transistor, the thin-film transistor being electrically connected via the respective gate line and the respective data line to the gate driver and the source driver respectively, the common electrode and the pixel electrode collectively forming a liquid crystal capacitor, the source driver applying a driving voltage of 0-6V via the thin-film transistor to the pixel electrode.

2. The vertical alignment liquid crystal panel as claimed in claim 1, wherein the ratio of the chiral agent added to the liquid crystal layer is determined by $C=1/(HTP*P)$, where C indicates mass percentage concentration of the chiral agent, P is pitch of the liquid crystal molecules, and HTP is the power of the chiral agent to cause the liquid crystal molecules to rotate, namely twisting force.

3. The vertical alignment liquid crystal panel as claimed in claim 2, wherein mass percentage concentration of the chiral agent added in the liquid crystal layer is 0.5%-5%.

4. The vertical alignment liquid crystal panel as claimed in claim 3, wherein mass percentage concentration of the photo- or heat-polymerizable polymer added in the liquid crystal layer is 0.1%-5%.

5. The vertical alignment liquid crystal panel as claimed in claim 1, wherein the photo- or heat-polymerizable polymer is formed of photo- or heat-polymerizable monomers irradiated by ultraviolet light or light comprising ultraviolet component.

6. The vertical alignment liquid crystal panel as claimed in claim 1, wherein the thin-film transistor comprises a source terminal, a gate terminal, and a drain terminal, the source terminal being electrically connected via the respective data line to the source driver, the gate terminal being electrically connected via the respective gate line to the gate driver, the drain terminal being electrically connected to the pixel electrode.

7. The vertical alignment liquid crystal panel as claimed in claim 1, wherein the liquid crystal molecules have a structural formula as follows:

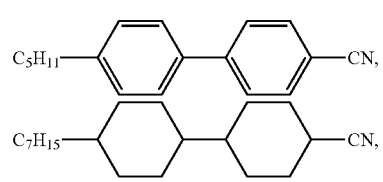

-continued

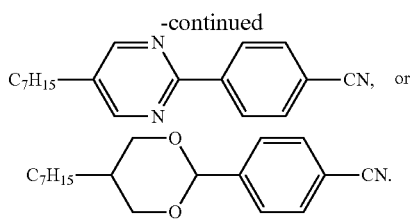

8. The vertical alignment liquid crystal panel as claimed in claim 1, wherein the chiral agent selectively comprises chiral agent S811, chiral agent R811, chiral agent S1011, chiral agent R1011, fluorine-contained chiral agent.

9. The vertical alignment liquid crystal panel as claimed in claim 1 further comprising a storage capacitor, the storage capacitor being connected in parallel with the liquid crystal capacitor.

10. A vertical alignment liquid crystal panel, comprising a first glass substrate, a second glass substrate that is arranged opposite to and parallel with the first glass substrate, and a liquid crystal layer, the first glass substrate comprising a first base and a first vertical alignment film, the second glass substrate comprising a second base and a second vertical alignment film, the first and second vertical alignment films being arranged between the first and second bases, the liquid crystal layer being arranged the first and second vertical alignment films, the liquid crystal layer comprising negative liquid crystal, a chiral agent, and a photo- or heat-polymerizable polymer, the negative liquid crystal comprising a plurality of liquid crystal molecules, the liquid crystal molecules having a pre-tilt angle of 0°-7°, the first glass substrate comprising a liquid crystal panel driving circuit formed thereon, the liquid crystal panel driving circuit comprising a gate driver, a source driver, a plurality of gate lines, and a plurality of data lines, the plurality of gate lines and data lines defining a plurality of pixel units, each of the pixel units comprising a thin-film transistor, a common electrode, and a pixel electrode electrically connected to the thin-film transistor, the thin-film transistor being electrically connected via the respective gate line and the respective data line to the gate driver and the source driver respectively, the common electrode and the pixel electrode collectively forming a liquid crystal capacitor, the source driver applying a driving voltage of 0-6V via the thin-film transistor to the pixel electrode;

wherein the ratio of the chiral agent added to the liquid crystal layer is determined by C=1/(HTP*P), where C indicates mass percentage concentration of the chiral agent, P is pitch of the liquid crystal molecules, and HTP is the power of the chiral agent to cause the liquid crystal molecules to rotate, namely twisting force;

wherein mass percentage concentration of the chiral agent added in the liquid crystal layer is 0.5%-5%;

wherein mass percentage concentration of the photo- or heat-polymerizable polymer added in the liquid crystal layer is 0.1%-5%;

wherein the photo- or heat-polymerizable polymer is formed of photo- or heat-polymerizable monomers irradiated by ultraviolet light or light comprising ultraviolet component;

wherein the thin-film transistor comprises a source terminal, a gate terminal, and a drain terminal, the source terminal being electrically connected via the respectively data line to the source driver, the gate terminal being electrically connected via the respective gate line to the gate driver, the drain terminal being electrically connected to the pixel electrode;

wherein the liquid crystal molecules have a structural formula as follows:

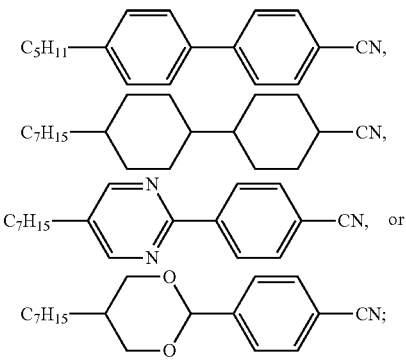

wherein the chiral agent selectively comprises chiral agent S811, chiral agent R811, chiral agent S1011, chiral agent R1011, fluorine-contained chiral agent; and further comprising a storage capacitor, the storage capacitor being connected in parallel with the liquid crystal capacitor.

* * * * *